US006979396B2

(12) United States Patent
Gillespie et al.

(10) Patent No.: US 6,979,396 B2
(45) Date of Patent: Dec. 27, 2005

(54) COMBINATION REFORMING AND ISOMERIZATION PROCESS

(75) Inventors: Ralph D. Gillespie, Gurnee, IL (US); Michelle J. Cohn, Glenview, IL (US); Richard R. Rosin, Arlington Heights, IL (US); Lynn H. Rice, Arlington Heights, IL (US); Margaret A. Stine, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/872,642

(22) Filed: Jun. 21, 2004

(65) Prior Publication Data

US 2005/0023189 A1 Feb. 3, 2005

Related U.S. Application Data

(60) Continuation-in-part of application No. 10/804,358, filed on Mar. 19, 2004, which is a continuation-in-part of application No. 10/717,812, filed on Nov. 20, 2003, now Pat. No. 6,881,873, and a continuation of application No. 10/718,050, filed on Nov. 20, 2003, which is a division of application No. 09/942,237, filed on Aug. 29, 2001, now Pat. No. 6,706,659.

(51) Int. Cl.[7] .............................................. C10G 63/02
(52) U.S. Cl. .......................................... 208/62; 208/66
(58) Field of Search .................................... 208/62, 66

(56) References Cited

U.S. PATENT DOCUMENTS

| | | | | |
|---|---|---|---|---|
| 2,939,896 | A | 6/1960 | Myers | 260/683.68 |
| 2,966,528 | A | 12/1960 | Haensel | 260/666 |
| 2,985,589 | A | 5/1961 | Broughton et al. | 210/34 |
| 3,040,777 | A | 6/1962 | Carson et al. | 137/625.15 |
| 3,175,444 | A | 3/1965 | Spinney | 83/251 |
| 3,422,848 | A | 1/1969 | Liebman et al. | 137/625.15 |
| 3,755,144 | A | 8/1973 | Asselin | 208/95 |
| 3,761,392 | A | 9/1973 | Pollock | 208/93 |
| 3,915,845 | A | 10/1975 | Antos | 208/139 |

(Continued)

FOREIGN PATENT DOCUMENTS

EP 0 666 109 A1 8/1995 .......... B01J 27/053

(Continued)

OTHER PUBLICATIONS

Robert A. Meyers, The Handbook of Petroleum Refining Processes, 1986, 5-49 through 5-51.

*Primary Examiner*—Thuan D. Dang
(74) *Attorney, Agent, or Firm*—John G. Tolomei; Maryann Maas

(57) ABSTRACT

A reforming and isomerization process has been developed. A reforming feedstream is charged to a reforming zone containing a reforming catalyst and operating at reforming conditions to generate a reforming zone effluent. Hydrogen and an isomerization feedstream is charged into an isomerization zone to contact an isomerization catalyst at isomerization conditions to increase the branching of the hydrocarbons. The isomerization catalyst is a solid acid catalyst comprising a support comprising a sulfated oxide or hydroxide of at least an element of Group IVB, a first component being at least one lanthanide series element, mixtures thereof, or yttrium, and a second component being a platinum group metal or mixtures thereof. The reforming zone effluent is combined with the isomerization zone effluent to form a combined effluent stream and separated into a product stream enriched in $C_5$ and heavier hydrocarbons and an overhead stream enriched in $C_4$ and lighter boiling compounds.

18 Claims, 5 Drawing Sheets

U.S. PATENT DOCUMENTS

| | | | | |
|---|---|---|---|---|
| 4,003,826 | A | 1/1977 | Antos | 208/139 |
| 4,024,052 | A | 5/1977 | Antos | 208/139 |
| 4,024,077 | A | 5/1977 | Engelhard et al. | 252/442 |
| 4,061,724 | A | 12/1977 | Grose et al. | 423/335 |
| 4,073,865 | A | 2/1978 | Flanigen et al. | 423/339 |
| 4,087,381 | A | 5/1978 | Antos | 252/441 |
| 4,181,599 | A | 1/1980 | Miller et al. | 208/79 |
| 4,310,440 | A | 1/1982 | Wilson et al. | 252/435 |
| 4,331,822 | A | 5/1982 | Onodera et al. | 585/482 |
| 4,440,871 | A | 4/1984 | Lok et al. | 502/214 |
| 4,457,832 | A | 7/1984 | Robinson | 208/66 |
| 4,485,185 | A | 11/1984 | Onodera et al. | 502/71 |
| 4,567,027 | A | 1/1986 | Detournay et al. | 423/101 |
| 4,567,029 | A | 1/1986 | Wilson et al. | 423/306 |
| 4,709,116 | A | 11/1987 | Zarchy et al. | 588/738 |
| 4,709,117 | A | 11/1987 | Gray, Jr. | 585/738 |
| 4,717,784 | A | 1/1988 | Stem et al. | 585/738 |
| 4,758,419 | A | 7/1988 | Lok et al. | 423/306 |
| 4,804,802 | A | 2/1989 | Evans et al. | 585/734 |
| 4,804,803 | A | 2/1989 | Schmidt et al. | 585/748 |
| 4,834,958 | A | 5/1989 | Zones | 423/277 |
| 4,899,012 | A | 2/1990 | Sachtler et al. | 585/482 |
| 4,909,116 | A | 3/1990 | Tanaka et al. | 84/692 |
| 4,918,041 | A | 4/1990 | Hollstein et al. | 502/217 |
| 4,939,110 | A | 7/1990 | Sachtler et al. | 502/66 |
| 4,956,519 | A | 9/1990 | Hollstein et al. | 585/751 |
| 5,019,671 | A | 5/1991 | Hsu et al. | 585/751 |
| 5,026,951 | A | 6/1991 | Schmidt et al. | 585/738 |
| 5,036,035 | A | 7/1991 | Baba et al. | 502/221 |
| 5,036,085 | A | 7/1991 | Heinemann et al. | 514/361 |
| 5,107,052 | A | 4/1992 | McCulloch et al. | 585/738 |
| 5,120,898 | A | 6/1992 | Baba et al. | 585/750 |
| 5,146,035 | A | 9/1992 | Spehlmann et al. | 585/667 |
| 5,146,037 | A | 9/1992 | Zarchy et al. | 585/738 |
| 5,157,199 | A | 10/1992 | Soled et al. | 585/750 |
| 5,182,247 | A | 1/1993 | Kuhlmann et al. | 502/217 |
| 5,212,136 | A | 5/1993 | Angstadt et al. | 502/206 |
| 5,214,017 | A | 5/1993 | Angstadt et al. | 502/204 |
| 5,310,868 | A | 5/1994 | Angstadt et al. | 585/721 |
| 5,321,197 | A | 6/1994 | Angstadt et al. | 585/721 |
| 5,340,465 | A | 8/1994 | Gillespie et al. | 208/191 |
| 5,360,534 | A | 11/1994 | Rice et al. | 208/139 |
| 5,491,278 | A | 2/1996 | Angstadt et al. | 585/731 |
| 5,493,067 | A | 2/1996 | Angstadt et al. | 585/731 |
| 5,629,257 | A | 5/1997 | Umansky et al. | 502/217 |
| 5,744,684 | A | 4/1998 | Zinnen et al. | 585/737 |
| 5,750,459 | A | 5/1998 | Marella et al. | 502/304 |
| 5,762,887 | A | 6/1998 | Girod et al. | 422/200 |
| 5,762,888 | A | 6/1998 | Sechrist | 422/216 |
| 5,768,904 | A | 6/1998 | Tagamolila et al. | 62/238.3 |
| 5,780,383 | A | 7/1998 | Hollstein et al. | 502/324 |
| 5,786,294 | A | 7/1998 | Sachtler et al. | 502/349 |
| 5,802,870 | A | 9/1998 | Arnold et al. | 62/480 |
| 5,831,139 | A | 11/1998 | Schmidt et al. | 585/315 |
| 5,837,641 | A | 11/1998 | Gosling et al. | 502/219 |
| 5,862,060 | A | 1/1999 | Murray, Jr. | 364/528.01 |
| 6,180,556 | B1 | 1/2001 | Marella et al. | 502/217 |
| 6,184,430 | B1 | 2/2001 | Venkatesh et al. | 585/750 |
| 6,214,764 | B1 | 4/2001 | Gillespie | 502/230 |
| 6,320,089 | B1 | 11/2001 | Gillespie | 585/744 |
| 6,359,179 | B1 | 3/2002 | Nemeth et al. | 568/387 |
| 6,448,198 | B1 | 9/2002 | Szabo et al. | 502/217 |
| 6,495,733 | B1 | 12/2002 | Peratello et al. | 585/743 |
| 6,573,417 | B1 | 6/2003 | Rice | 585/738 |
| 6,593,504 | B1 | 7/2003 | Bricker et al. | 585/470 |
| 6,706,659 | B2 | 3/2004 | Gillespie et al. | 502/217 |
| 2004/0067845 | A1 | 4/2004 | Furuta et al. | 502/216 |

FOREIGN PATENT DOCUMENTS

| | | | |
|---|---|---|---|
| EP | 0983967 | A1 | 3/2000 |
| EP | 1002579 | A1 | 5/2000 |

COMBINATION REFORMING AND ISOMERIZATION PROCESS

CROSS-REFERENCE TO RELATED APPLICATION

This application is a continuation-in-part of our copending application Ser. No. 10/804,358 filed Mar. 19, 2004, which is a Continuation-In-Part of applications Ser. No. 10/717,812, now U.S. Pat. No. 6,881,873 and Ser. No. 10/718,050 both filed Nov. 20, 2003 which applications are a Division and a Continuation, respectively, of application Ser. No. 09/942,237 filed Aug. 29, 2001, now U.S. Pat. No. 6,706,659, the contents of all are hereby incorporated by reference in their entirety.

STATEMENT REGARDING FEDERALLY SPONSORED RESEARCH OR DEVELOPMENT

This work was performed under the support of the U.S. Department of Commerce, National Institute of Standards and Technology, Advanced Technology Program, Cooperative Agreement Number 70NANB9H3035. The United States Government has certain rights in this invention.

FIELD OF THE INVENTION

This invention relates generally to the parallel reforming and isomerization of hydrocarbons with integrated downstream separation of the effluents of the reforming zone and isomerization zone. This invention relates more specifically to the reforming of from $C_6$ to $C_{12}$ hydrocarbons and the isomerization of light paraffins with the isomerization zone using a novel solid catalyst.

BACKGROUND OF THE INVENTION

High octane gasoline is required for modem gasoline engines. Formerly it was common to accomplish octane number improvement by the use of various lead-containing additives. As lead is phased out of gasoline for environmental reasons, it has become increasingly necessary to rearrange the structure of the hydrocarbons used in gasoline blending in order achieve higher octane ratings. Catalytic reforming and catalytic isomerization are two widely used processes for this upgrading.

The traditional gasoline blending pool normally includes $C_4$ and heavier hydrocarbons having boiling points of less than 205° C. (395° F.) at atmospheric pressure. This range of hydrocarbon includes $C_4$–$C_6$ paraffins and especially the $C_5$ and $C_6$ normal paraffins which have relatively low octane numbers. The $C_4$–$C_6$ hydrocarbons have the greatest susceptibility to octane improvement by lead addition and were formerly upgraded in this manner. With eventual phase out of lead additives octane improvement was obtained by using isomerization to rearrange the structure of the paraffinic hydrocarbons into branched-chain paraffins or reforming to convert the $C_6$ and heavier hydrocarbons to aromatic compounds. Normal $C_5$ hydrocarbons are not readily converted into aromatics, therefore, the common practice has been to isomerize these lighter hydrocarbons into corresponding branched-chain isoparaffins. Although the $C_6$ and heavier hydrocarbons can be upgraded into aromatics through hydrocyclization, the conversion of $C_6$'s to aromatics creates higher density species and increases gas yields with both effects leading to a reduction in liquid volume yields. Moreover, the health concerns related to benzene are likely to generate overall restrictions on benzene and possibly aromatics as well, which some view as precursors for benzene tail pipe emissions. Therefore, it is preferred to change the $C_6$ paraffins to an isomerization unit to obtain $C_6$ isoparaffin hydrocarbons. Consequently, octane upgrading commonly uses isomerization to convert $C_6$ and lighter boiling hydrocarbons.

Combination processes using isomerization and reforming to convert naphtha range feedstocks are well known. U.S. Pat. No. 4,457,832 uses reforming and isomerization in combination to upgrade a naphtha feedstock by first reforming the feedstock, separating a C5–C6 paraffin fraction from the reformate product, isomerizing the C5–C6 fraction to upgrade the octane number of these components and recovering a C5–C6 isomerate liquid which may be blended with the reformate product. U.S. Pat. No. 4,181,599 and U.S. Pat. No. 3,761,392 show a combination isomerization-reforming process where a full range naphtha boiling feedstock enters a first distillation zone which splits the feedstock into a lighter fraction which enters an isomerization zone and a heavier fraction that is charged as feed to a reforming zone. In both the '392 and '599 patents, reformate from one or more reforming zones undergoes additional separation and conversion, the separation including possible aromatics recovery, which results in additional C5–C6 hydrocarbons being charged to the isomerization zone.

The effluent from a reforming zone will contain a portion of hydrogen which may be used in the isomerization zone. Therefore combining the effluents to separate a stream containing hydrogen for recycle to the isomerization zone is desirable. Isomerized products are separate in a common vessel with the reforming zone products. Portions of the streams from the integrated separation may be recycled, may be used in gasoline blending or may be further processed.

The present invention involves a reforming zone where a portion of the reforming zone effluent is directed to an isomerization zone where the isomerization zone uses a novel catalyst and where the reforming zone effluent and the isomerization zone effluent use integrated separation units. The isomerization catalyst is a solid acid catalyst comprising a support comprising a sulfated oxide or hydroxide of at least an element of Group IVB (IUPAC 4) of the Periodic Table, a first component selected from the group consisting of at least one lanthanide-series element, mixtures thereof, and yttrium, and a second component selected from the group of platinum-group metals and mixtures thereof. In one embodiment of the invention, the atomic ratio of the first component to the second component is at least about 2. In another embodiment of the invention, the isomerization catalyst further comprises from about 2 to 50 mass-% of a refractory inorganic-oxide binder. In yet another embodiment of the invention, the isomerization catalyst further comprises from about 2 to 50 mass-% of a refractory inorganic-oxide binder having one or more platinum group metals dispersed thereon.

SUMMARY OF THE INVENTION

The invention is a process having both a reforming zone and an isomerization zone involving charging a reforming feedstream to a reforming zone containing a reforming catalyst and operating at reforming conditions to generate a reforming zone effluent and charging hydrogen and an isomerization feedstream comprising $C_5$–C6 hydrocarbons into an isomerization zone and contacting said hydrogen and feedstream with an isomerization catalyst at isomerization conditions to increase the branching of the feedstream hydrocarbons and produce an isomerization effluent stream comprising at least normal pentane, normal hexane, methylbutane, dimethylbutane, and methylpentane. The isomerization catalyst is a solid acid catalyst comprising a support comprising a sulfated oxide or hydroxide of at least an element of Group IVB (IUPAC 4) of the Periodic Table, a first component selected from the group consisting of at least one lanthanide-series element, mixtures thereof, and yttrium, and a second component selected from the group of platinum-group metals and mixtures thereof. The reforming zone effluent and the isomerization zone effluents are combined, and the combined effluents stream is separated into a product stream enriched in $C_5$ and heavier hydrocarbons and an overhead stream enriched in $C_4$ and lighter boiling compounds. A portion of the overhead stream enriched in $C_4$ and lighter boiling compounds may be combined with the isomerization zone feedstream in addition to or in place of the independent source of hydrogen.

The atomic ratio of the first component of the isomerization catalyst to the second component of the isomerization catalyst may be at least about 2, and the catalyst may further comprise from about 2 to 50 mass-% of a refractory inorganic-oxide binder. The first component of the isomerization catalyst may be selected from the group consisting of lutetium, ytterbium, thulium, erbium, holmium, terbium, combinations thereof, and yttrium. The isomerization catalyst may further comprise a third component selected from the group consisting of iron, cobalt, nickel, rhenium, and mixtures thereof.

The process may further comprise passing the product stream enriched in $C_5$ and heavier hydrocarbons that was separated from the combined effluents stream to a separation zone. The separation zone may contain a fractional distillation unit such as a stabilizer. The separation zone may operate to further refine the separation of $C_4$ and lighter boiling compounds from $C_5$ and heavier hydrocarbons. Multiple streams may be removed from the stabilizer.

Additional objects, embodiments and details of this invention can be obtained from the following detailed description of the invention.

DETAILED DESCRIPTION OF THE INVENTION

Figure 1:
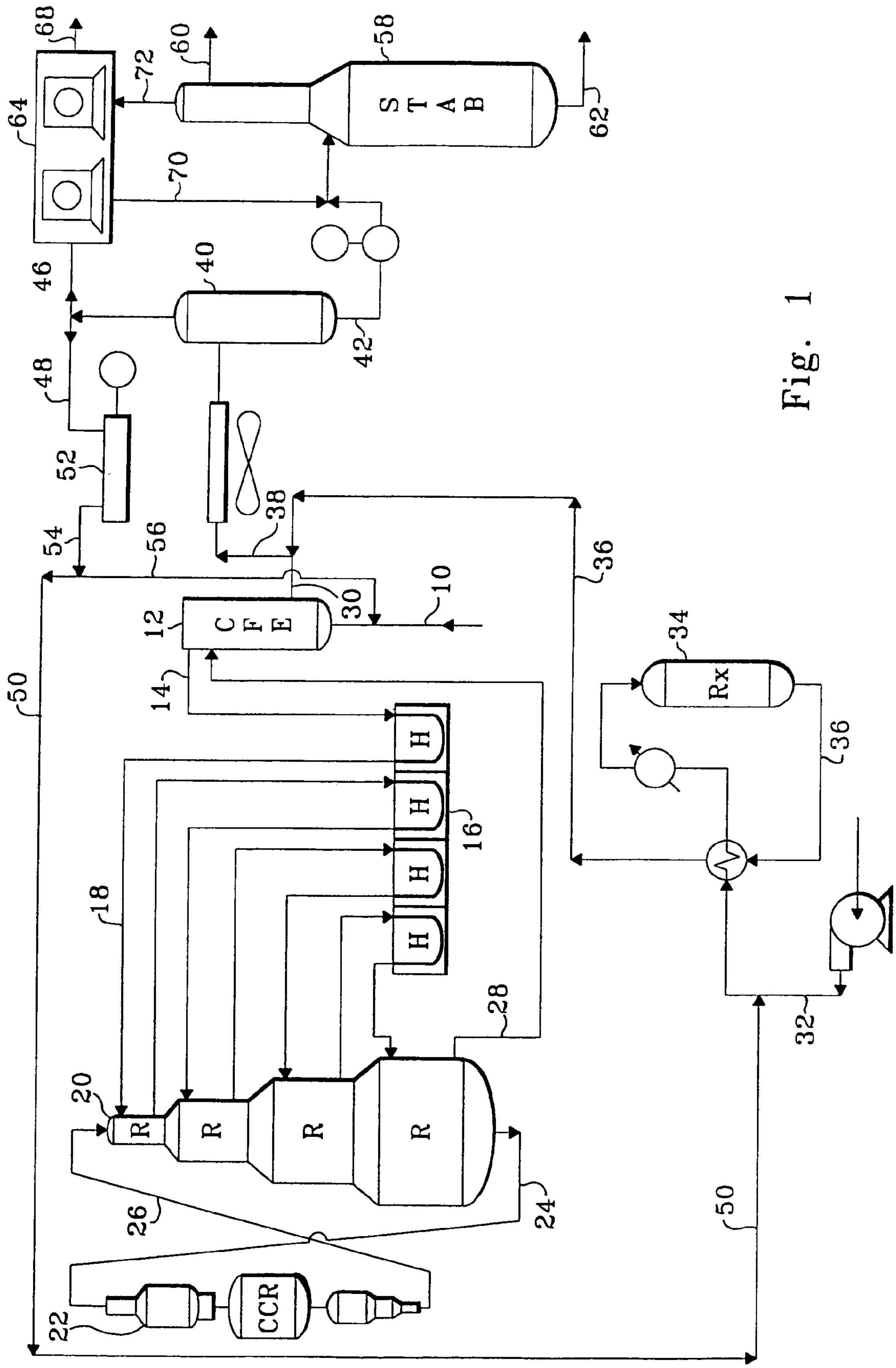
FIG. 1 is a schematic drawing of the process of this invention where the reforming zone is operated in the continuous regeneration mode.

In general terms, one embodiment of the invention comprises both a reforming zone and an isomerization zone operating concurrently, wherein the effluents of each zone are combined for further processing using common product processing equipment.

With respect to the reforming zone, a wide variety of reforming zone feed stocks may be used. In general, the reforming zone feed stock contains from $C_6$ to about $C_{11}$ or $C_{12}$ hydrocarbons with a boiling point range from about 82 to about 240° C.

Specific reforming zone feedstocks may be generated using separation techniques. For example, a naphtha feedstock may be introduced into a separation zone comprising one or more fractional distillation columns to separate a heart-cut naphtha fraction from a heavy naphtha fraction. The lower-boiling heart-cut naphtha may contain a substantial concentration of $C_7$ and $C_8$ hydrocarbons, which can be catalytically reformed to produce a reformate component suitable for blending into current reformulated gasolines. This heart-cut naphtha also may contain significant concentrations of $C_6$ and $C_9$ hydrocarbons, plus smaller amounts of lower- and higher-boiling hydrocarbons, depending on the applicable gasoline specifications and product needs. The heart-cut naphtha end point may range from about 130° to 175° C., and preferably is within the range of about 145° to 165° C. The higher-boiling heavy naphtha may contain a substantial amount of $C_{10}$ hydrocarbons, and also may contain significant quantities of lighter and heavier hydrocarbons depending primarily on a petroleum refiner's overall product balance. The initial boiling point of the heavy naphtha is between about 120° and 175° C., and preferably is between 140° and 165° C.

A light naphtha fraction may also be separated from the naphtha feedstock in the separation zone. The light naphtha comprises pentanes, and may comprise $C_6$ and possibly a limited amount of $C_7$ hydrocarbons. This fraction may be separated from the heart-cut naphtha because pentanes are not converted efficiently in a reforming zone, and optionally because $C_6$ hydrocarbons may be an undesirable feed to catalytic reforming where they are converted to benzene for which gasoline restrictions are being implemented. The light, naphtha fraction may be separated from the naphtha feedstock before it enters the separation zone, in which case the separation zone would only separate heart-cut naphtha from heavy naphtha. If the pentane content of the naphtha feedstock is substantial, however, separation of light naphtha generally is desirable. This alternative separation zone generally comprises two fractionation columns, although in some cases a single column recovering light naphtha overhead, heavy naphtha from the bottom and heart-cut naphtha as a side stream could be suitable.

For purposes of describing this invention, the reforming zone feedstock will contain from $C_6$ to about $C_{12}$ hydrocarbons with a boiling point range from about 82 to about 204° C. The reforming zone feedstock is introduced to a heat exchanger to exchange heat with the reforming zone effluent stream. The heated reforming zone feed stream is then conducted to the reforming zone. The reforming zone upgrades the octane number of the reforming feed stream through a variety of reactions including naphthene dehydrogenation and paraffin dehydrocyclization and isomerization. The product reformate, combined with the product isomerate may be used for gasoline blending.

Reforming operating conditions used in the reforming zone of the present invention include a pressure of from about atmospheric to 60 atmospheres (absolute), with the preferred range being from atmospheric to 20 atmospheres and a pressure of below 10 atmospheres being especially preferred. Hydrogen is generated within the reforming zone, but additional hydrogen may be directed, if necessary, to the reforming zone in an amount sufficient to correspond to a ratio of from about 0.1 to 10 moles of hydrogen, but generated and added, per mole of hydrocarbon feedstock. The volume of the contained reforming catalyst corresponds to a liquid hourly space velocity of from about 1 to 40 $hr^{-1}$. The operating temperature generally is in the range of 260° to 560° C.

The reforming catalyst comprises a supported platinum-group metal component. This component comprises one or more platinum-group metals, with a platinum component being preferred. The platinum may exist within the catalyst as a compound such as the oxide, sulfide, halide, or oxyhalide, in chemical combination with one or more other ingredients of the catalytic composite, or as an elemental metal. Best results are obtained when substantially all of the platinum exists in the catalytic composite in a reduced state. The preferred platinum component generally comprises from about 0.01 to 2 mass % of the catalytic composite, preferably 0.05 to 1 mass %, calculated on an elemental basis.

It is within the scope of the present invention that the catalyst may contain other metal components known to modify the effect of the preferred platinum component. Such metal modifiers may include Group IVA (14) metals, other Group VII (8–10) metals, rhenium, indium, gallium, zinc, uranium, dysprosium, thallium and mixtures thereof. A preferred metal modifier is a tin component. Catalytically effective amounts of such metal modifiers may be incorporated into the catalyst by any means known in the art.

The reforming catalyst conveniently is a dual-function composite containing a metallic hydrogenation-dehydrogenation component on a refractory support which provides acid sites for cracking and isomerization. The refractory support of the reforming catalyst should be a porous, adsorptive, high-surface-area material which is uniform in composition without composition gradients of the species inherent to its composition. Within the scope of the present invention are refractory supports containing one or more of: (1) refractory inorganic oxides such as alumina, silica, titania, magnesia, zirconia, chromia, thoria, boria or mixtures thereof; (2) synthetically prepared or naturally occurring clays and silicates, which may be acid-treated; (3) crystalline zeolitic aluminosilicates, either naturally occurring or synthetically prepared such as FAU, MEL, MFI, MOR, MTW (IUPAC Commission on Zeolite Nomenclature), in hydrogen form or in a form which has been exchanged with metal cations; (4) non-zeolitic molecular sieves as disclosed in U.S. Pat. No. 4,741,820, incorporated by reference; (5) spinels such as $MgAl_2O_4$, $FeAl_2O_4$, $ZnAl_2O_4$, $CaAl_2O_4$; and (6) combinations of materials from one or more of these groups.

The preferred refractory support for the reforming catalyst is alumina, with gamma- or eta-alumina being particularly preferred. Best results are obtained with an alumina is that which has been characterized in U.S. Pat. No. 3,852,190 and U.S. Pat. No. 4,012,313 as a byproduct from a Ziegler higher alcohol synthesis reaction as described in Ziegler's U.S. Pat. No. 2,892,858. For purposes of simplification, such an alumina will be hereinafter referred to as a "Ziegler alumina." Ziegler alumina is presently available from the Vista Chemical Company under the trademark "Catapal" or from Condea Chemie GMBH under the trademark "Pural." This material is an extremely high purity pseudo-boehmite powder which, after calcination at a high temperature, has been shown to yield a high-purity gamma-alumina.

The alumina powder may be formed into any shape or form of carrier material known to those skilled in the art such as spheres, extrudates, rods, pills, pellets, tablets or granules. Preferred spherical particles may be formed by converting the alumina powder into alumina sol by reaction with suitable peptizing acid and water and dropping a mixture of the resulting sol and gelling agent into an oil bath to form spherical particles of an alumina gel, followed by known aging, drying and calcination steps. The alternative extrudate form is preferably prepared by mixing the alumina powder with water and suitable peptizing agents, such as nitric acid, acetic acid, aluminum nitrate and like materials, to form an extrudable dough having a loss on ignition (LOI) at 500° C. of about 45 to 65 mass %. The resulting dough is extruded through a suitably shaped and sized die to form extrudate particles, which are dried and calcined by known methods. Alternatively, spherical particles can be formed from the extrudates by rolling the extrudate particles on a spinning disk.

The reforming catalyst optimally contains a halogen component. The halogen component may be either fluorine, chlorine, bromine or iodine or mixtures thereof. Chlorine is the preferred halogen component. The halogen component is generally present in a combined state with the inorganic-oxide support. The halogen component is preferably well dispersed throughout the catalyst and may comprise from more than 0.2 to about 15 mass %, calculated on an elemental basis, of the final catalyst. Further details of the preparation and activation of embodiments of the above reforming catalyst are disclosed in U.S. Pat. No. 4,677,094, which is incorporated into this specification by reference thereto.

In an advantageous alternative embodiment, the reforming catalyst comprises a large-pore molecular sieve. The term "large-pore molecular sieve" is defined as a molecular sieve having an effective pore diameter of about 7 angstroms or larger. Examples of large-pore molecular sieves which might be incorporated into the present catalyst include LTL, FAU, AFI and MAZ (IUPAC Commission on Zeolite Nomenclature) and zeolite-beta.

Preferably the alternative embodiment of the reforming catalyst contains a nonacidic L-zeolite (LTL) and an alkali-metal component as well as a platinum-group metal component. It is essential that the L-zeolite be nonacidic, as acidity in the zeolite lowers the selectivity to aromatics of the finished catalyst. In order to be "nonacidic," the zeolite has substantially all of its cationic exchange sites occupied by nonhydrogen species. Preferably the cations occupying the exchangeable cation sites will comprise one or more of the alkali metals, although other cationic species may be present. An especially preferred nonacidic L-zeolite is potassium-form L-zeolite.

It is necessary to composite the L-zeolite with a binder in order to provide a convenient form for use in the catalyst of the present invention. The art teaches that any refractory inorganic oxide binder is suitable. One or more of silica, alumina or magnesia are preferred binder materials of the present invention. Amorphous silica is especially preferred, and excellent results are obtained when using a synthetic white silica powder precipitated as ultra-fine spherical particles from a water solution. The silica binder preferably is nonacidic, contains less than 0.3 mass % sulfate salts, and has a BET surface area of from about 120 to 160 $m^2$/g.

The L-zeolite and binder may be composited to form the desired catalyst shape by any method known in the art. For example, potassium-form L-zeolite and amorphous silica may be commingled as a uniform powder blend prior to introduction of a peptizing agent. An aqueous solution comprising sodium hydroxide is added to form an extrudable dough. The dough preferably will have a moisture content of from 30 to 50 mass % in order to form extrudates having acceptable integrity to withstand direct calcination. The resulting dough is extruded through a suitably shaped and sized die to form extrudate particles, which are dried and calcined by known methods. Alternatively, spherical particles may be formed by methods described hereinabove for the first reforming catalyst.

An alkali metal component is an essential constituent of the alternative reforming catalyst. One or more of the alkali metals, including lithium, sodium, potassium, rubidium, cesium and mixtures thereof, may be used, with potassium being preferred. The alkali metal optimally will occupy essentially all of the cationic exchangeable sites of the nonacidic L-zeolite. Surface-deposited alkali metal also may be present as described in U.S. Pat. No. 4,619,906, incorporated herein by reference thereto.

Further details of the preparation and activation of embodiments of the alternative reforming catalyst are disclosed, e.g., in U.S. Pat. No. 4,619,906 and U.S. Pat. No. 4,822,762, which are incorporated into this specification by reference thereto.

The final reforming catalyst generally will be dried at a temperature of from about 100° to 320° C. for about 0.5 to 24 hours, followed by oxidation at a temperature of about 300° to 550° C. in an air atmosphere for 0.5 to 10 hours. Preferably the oxidized catalyst is subjected to a substantially water-free reduction step at a temperature of about 300° to 550° C. (preferably about 350° C.) for 0.5 to 10 hours or more. The duration of the reduction step should be only, as long as necessary to reduce the platinum, in order to avoid pre-deactivation of the catalyst, and may be performed in-situ as part of the plant startup if a dry atmosphere is maintained.

The reforming zone feed stream may contact the reforming catalyst in either upflow, downflow, or radial-flow mode. The catalyst is contained in a fixed-bed reactor or in a moving-bed reactor whereby catalyst may be continuously withdrawn and added. These alternatives are associated with catalyst-regeneration options known to those of ordinary skill in the art, such as: (1) a semiregenerative unit containing fixed-bed reactors maintains operating severity by increasing temperature, eventually shutting the unit down for catalyst regeneration and reactivation; (2) a swing-reactor unit, in which individual fixed-bed reactors are serially isolated by manifolding arrangements as the catalyst become deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, permitting higher operating severity by maintaining high catalyst activity through regeneration cycles of a few days; or: (4) a hybrid system with semiregenerative and continuous-regeneration provisions in the same unit. The preferred embodiment of the present invention is a moving-bed reactor with continuous catalyst regeneration, in order to realize high yields of desired $C_5$+ product at relatively low operating pressures associated with more rapid catalyst deactivation. The total product stream from the reforming zone generally is conducted to the heat exchanger to exchange heat with the reforming zone feedstock.

Concurrently with the conversion occurring the in the reforming zone, isomerization is occurring in the isomerization zone. The feedstock to the isomerization zone includes a hydrocarbon fraction rich in $C_4$–$C_7$ normal paraffins. The term "rich" is defined to mean a stream having more than 50% of the mentioned component. Preferred feedstocks are substantially pure normal paraffin streams having from 5 to 6, and some having 7 carbon atoms or a mixture of such substantially pure normal paraffins. Other useful feedstocks include light natural gasoline, light straight run naphtha, gas oil condensate, light raffinates, light reformate, light hydrocarbons, field butanes, and straight run distillates having distillation end points of about 77° C. and containing substantial quantities of $C_4$–$C_6$ paraffins. The feed stream may also contain low concentrations of unsaturated hydrocarbons and hydrocarbons having more than 6 carbon atoms.

Hydrogen is admixed with the feed in an amount that will provide a hydrogen to hydrocarbon ratio equal to from about 0.05 to about 5.0 in the effluent from the isomerization zone. Hydrogen may be consumed in the isomerization zone, especially in the saturation of benzene. Additionally, the isomerization zone will have a net consumption of hydrogen often referred to as the stoichiometric hydrogen requirement which is associated with a number of side reactions that occur. These side reactions include cracking and disproportionation. Other reactors that will also consume hydrogen include olefin and aromatics saturation. For feeds having a low level of unsaturates, satisfying the stoichiometric hydrogen requirements demand a hydrogen to hydrocarbon molar ratio for the inlet stream of between 0.05 to 5.0. Hydrogen in excess of the stoichiometric amounts for the side reactions is maintained in the reaction zone to provide good stability and conversion by compensating for variations in feed stream compositions that alter the stoichiometric hydrogen requirements.

Hydrogen may be added to the feed mixture in any manner that provides the necessary control for the addition of small hydrogen quantities. Metering and monitoring devices for this purpose are well known by those skilled in the art. As currently practiced, a control valve is used to meter the addition of hydrogen to the feed mixture. The hydrogen concentration in the outlet stream or one of the outlet stream fractions is monitored by a hydrogen monitor and the control valve setting position is adjusted to maintain the desired hydrogen concentration. The hydrogen concentration at the effluent is calculated on the basis of total effluent flow rates.

The hydrogen may be provided in a stream generated through the separation of a combined reforming zone effluent and isomerization zone effluent stream. The stream, an overhead stream enriched in $C_4$ and lighter hydrocarbons, will contain hydrogen from the reforming process. This overhead stream containing hydrogen may supplement or replace an independent hydrogen source.

The hydrogen and hydrocarbon feed mixture is contacted in the reaction zone with a novel isomerization catalyst. The novel isomerization catalyst comprises a sulfated support of an oxide or hydroxide of a Group IVB (IUPAC 4) metal, preferably zirconium oxide or hydroxide, at least a first component which is a lanthanide element or yttrium component, and at least a second component being a platinum-group metal component. Preferably, the first component contains at least ytterbium and the second component is platinum. The catalyst optionally contains an inorganic-oxide binder, especially alumina. The catalyst is fully described in U.S. Pat. No. 6,706,659 which is hereby incorporated by reference in its entirety.

The support material of the isomerization catalyst of the present invention comprises an oxide or hydroxide of a Group IVB (IUPAC 4). In one embodiment the Group IVB element is zirconium or titanium. Sulfate is composited on the support material. A component of a lanthanide-series element is incorporated into the composite by any suitable means. A platinum-group metal component is added to the isomerization catalytic composite by any means known in the art to effect the catalyst of the invention, e.g., by impregnation. Optionally, the catalyst is bound with a refractory inorganic oxide. The support, sulfate, metal components and optional binder may be composited in any order effective to prepare a catalyst useful for the isomerization of hydrocarbons.

Production of the support of the isomerization catalyst is described in U.S. Pat. No. 6,706,659 and not reproduced here. A sulfated support is prepared by treatment with a suitable sulfating agent to form a solid strong acid. Sulfate ion is incorporated into a catalytic composite, for example, by treatment with sulfuric acid in a concentration usually of about 0.01–10N and preferably from about 0.1–5N. Compounds such as hydrogen sulfide, mercaptans or sulfur dioxide, which are capable of forming sulfate ions upon calcining, may be employed as alternative sources. Ammonium sulfate may be employed to provide sulfate ions and form a solid strong acid catalyst. The sulfur content of the finished catalyst generally is in the range of about 0.5 to 5 mass-%, and preferably is from about 1 to 2.5 mass-%. The sulfated composite is dried, preferably followed by calcination at a temperature of about 500 to 800° C. particularly if the sulfation is to be followed by incorporation of the platinum-group metal.

A first component, comprising one or more of the lanthanide-series elements, yttrium, or mixtures thereof, is another essential component of the present catalyst. Included in the lanthanide series are lanthanum, cerium, praseodymium, neodymium, promethium, samarium, europium, gadolinium, terbium, dysprosium, holmium, erbium, thulium, ytterbium and lutetium. Preferred lanthanide series elements include lutetium, ytterbium, thulium, erbium, holmium, terbium, and mixtures thereof. Ytterbium is a most preferred component of the present catalyst. The first component may in general be present in the catalytic composite in any catalytically available form such as the elemental metal, a compound such as the oxide, hydroxide, halide, oxyhalide, carbonate or nitrate or in chemical combination with one or more of the other ingredients of the catalyst. The first component is preferably an oxide, an intermetallic with platinum, a sulfate, or in the zirconium lattice. The materials are generally calcined between 600 and 800° C. and thus in the oxide form. The lanthanide element or yttrium component can be incorporated into the catalyst in any amount which is catalytically effective, suitably from about 0.01 to about 10 mass-% lanthanide or yttrium, or mixtures, in the catalyst on an elemental basis. Best results usually are achieved with about 0.5 to about 5 mass-% lanthanide or yttrium, calculated on an elemental basis. The preferred atomic ratio of lanthanide or yttrium to platinum-group metal for this catalyst is at least about 1:1, preferably about 2:1 or greater, and especially about 5:1 or greater.

The first component is incorporated in the isomerization catalytic composite in any suitable manner known to the art, such as by coprecipitation, coextrusion with the porous carrier material, or impregnation of the porous carrier material either before, after, or simultaneously with sulfate though not necessarily with equivalent results.

A second component, a platinum-group metal, is an essential ingredient of the catalyst. The second component comprises at least one of platinum, palladium, ruthenium, rhodium, iridium, or osmium; platinum is preferred, and it is especially preferred that the platinum-group metal consists essentially of platinum. The platinum-group metal component may exist within the final catalytic composite as a compound such as an oxide, sulfide, halide, oxyhalide, etc., in chemical combination with one or more of the other ingredients of the composite or as the metal. Amounts in the range of from about 0.01 to about 2-wt. % platinum-group metal component, on an elemental basis, are preferred. Best results are obtained when substantially all of the platinum-group metal is present in the elemental state.

The second component, a platinum-group metal component, is deposited on the composite using the same means as for the first component described above. Illustrative of the decomposable compounds of the platinum group metals are chloroplatinic acid, ammonium chloroplatinate, bromoplatinic acid, dinitrodiamino platinum, sodium tetranitroplatinate, rhodium trichoride, hexa-amminerhodium chloride, rhodium carbonylchloride, sodium hexanitrorhodate, chloropalladic acid, palladium chloride, palladium nitrate, diamminepalladium hydroxide, tetraamnminepalladium chloride, hexachloroiridate (IV) acid, hexachloroiridate (III) acid, ammonium hexachloroiridate (III), ammonium aquohexachloroiridate (IV), ruthenium tetrachloride, hexachlororuthenate, hexa-ammineruthenium chloride, osmium trichloride and ammonium osmium chloride. The second component, a platinum-group component, is deposited on the support either before, after, or simultaneously with sulfate and/or the first component though not necessarily with equivalent results. It is preferred that the platinum-group component is deposited on the support either after or simultaneously with sulfate and/or the first component.

In addition to the first and second components above, the isomerization catalyst may optionally further include a third component of iron, cobalt, nickel, rhenium or mixtures thereof. Iron is preferred, and the iron may be present in amounts ranging from about 0.1 to about 5-wt. % on an elemental basis. The third component, such as iron, may function to lower the amount of the first component, such as ytterbium, needed in the optimal formulation. The third component may be deposited on the composite using the same means as for the first and second components as described above. When the third component is iron, suitable compounds would include iron nitrate, iron halides, iron sulfate and any other soluble iron compound.

The isomerization catalytic composite described above can be used as a powder or can be formed into any desired shapes such as pills, cakes, extrudates, powders, granules, spheres, etc., and they may be utilized in any particular size. The composite is formed into the particular shape by means well known in the art. In making the various shapes, it may be desirable to mix the composite with a binder. However, it must be emphasized that the catalyst may be made and successfully used without a binder. The binder, when employed, usually comprises from about 0.1 to 50 mass-%, preferably from about 5 to 20 mass-%, of the finished catalyst. The art teaches that any refractory inorganic oxide binder is suitable. One or more of silica, alumina, silica-alumina, magnesia and mixtures thereof are suitable binder materials of the present invention. A preferred binder material is alumina, with eta- and/or especially gamma-alumina being favored. Examples of binders which can be used include but are not limited to alumina, silica, silica-alumina and mixtures thereof. Usually the composite and optional binder are mixed along with a peptizing agent such as HCl, $HNO_3$, KOH, etc. to form a homogeneous mixture which is formed into a desired shape by forming means well known in the art. These forming means include extrusion, spray drying, oil dropping, marumarizing, conical screw mixing, etc. Extrusion means include screw extruders and extrusion presses. The forming means will determine how much water, if any, is added to the mixture. Thus, if extrusion is used, then the mixture should be in the form of a dough, whereas if spray drying or oil dropping is used, then enough water needs to be present in order to form a slurry. These particles are calcined at a temperature of about 260° C. to about 650° C. for a period of about 0.5 to about 2 hours.

The isomerization catalytic composites of the present invention either as synthesized or after calcination can be used as isomerization catalysts in the present invention. Calcination is required to form zirconium oxide from zirconium hydroxide.

Figure 3:
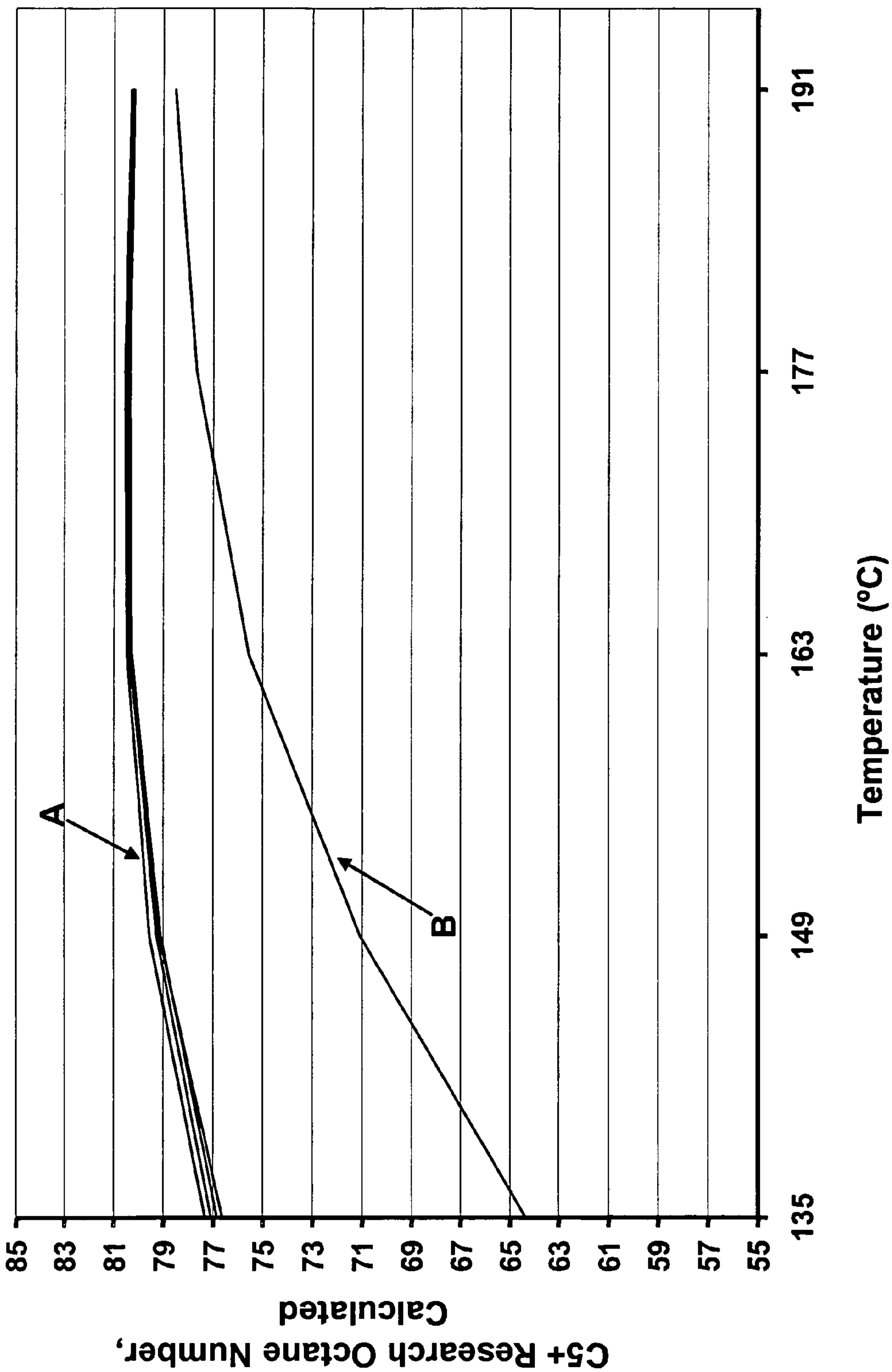
FIG. 3 is a plot of the octane number of the isomerized product streams versus temperature for an isomerization process using an available sulfated zirconia catalyst as compared to the isomerization catalyst the present invention.
Figure 4:
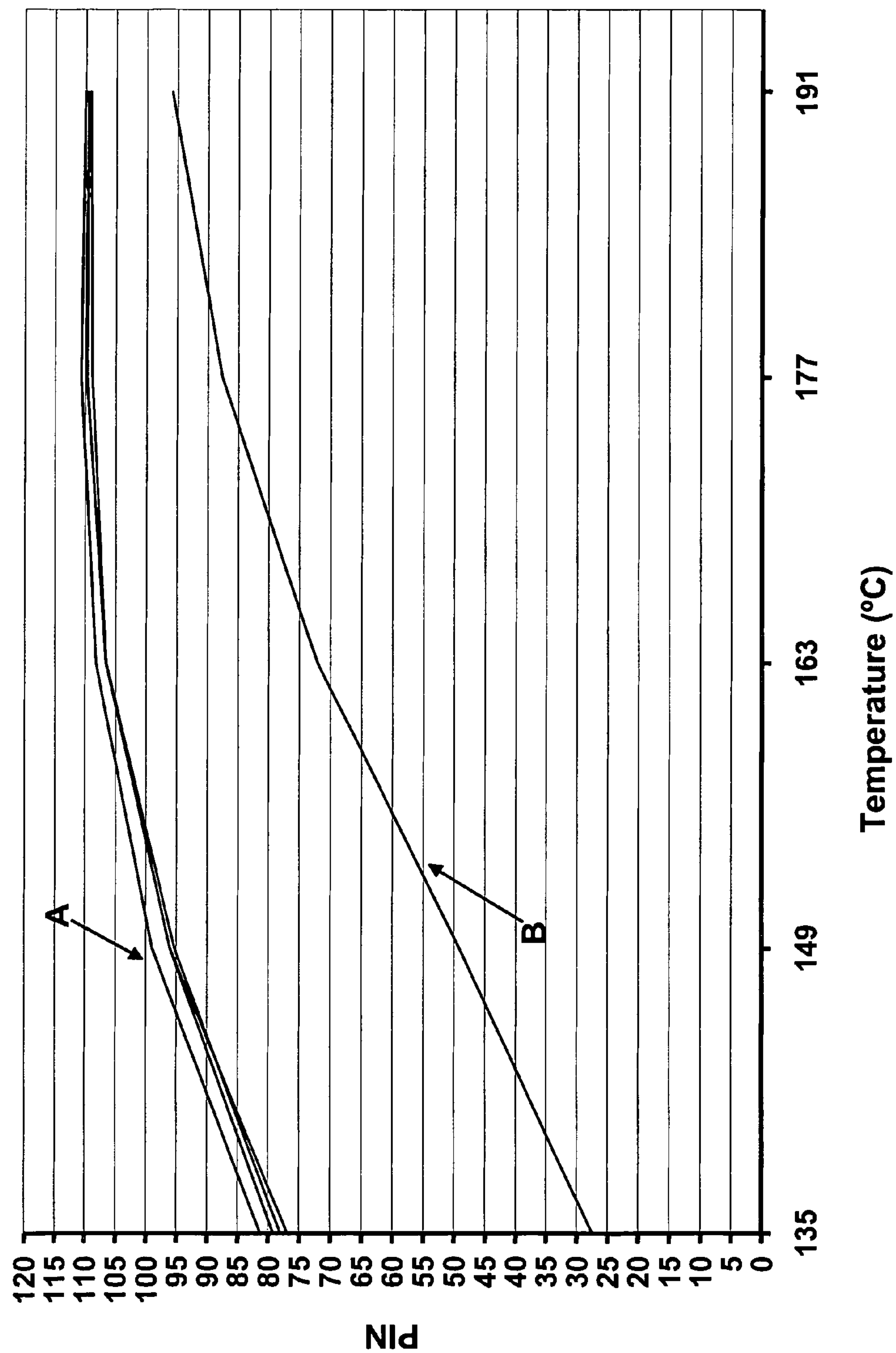
FIG. 4 is a plot of the percent isoparaffins in a product stream versus temperature for an isomerization process using an available sulfated zirconia catalyst as compared to the isomerization catalyst of the present invention.

One unexpected benefit of the present invention is the dramatic increase in the high octane components of the isomerized product. The example and FIG. 3 show a comparison of the research octane number of the product stream generated using the novel isomerization catalyst of the present invention (repeated experiments) with that generated using an available sulfated zirconia catalyst as described in U.S. Pat. No. 5,036,085 and U.S. Pat. No. 5,120,898 hereby incorporated by reference in their entirety. The increase in highly valued products is partially explained by the increased ability of the catalyst of the present invention to convert normal paraffins into isoparaffins. The example and FIG. 4 show that the normal paraffin compounds that are converted to isoparaffin compounds using the present invention is substantially greater than that generated using an available sulfated zirconia catalyst. FIG. 4 shows the paraffin isomerization number (PIN) of the product stream as plotted versus temperature. The PIN number is a measure of the amount of iso-$C_5$ paraffin and the highest octane $C_6$ paraffins in a stream. The PIN is calculated as follows:

$$PIN = \text{wt \% } i\text{-}C_5/(\text{wt \% } C_5 \text{ paraffins}) + \text{wt \% } 22DMB + \text{wt \% } 23DMB)/(\text{wt \% } C_6 \text{ paraffins})$$

Where i-$C_5$ is isopentane, 22DMB is 2,2-dimethylbutane, and 23DMB is 2,3-dimethylbutane.

Figure 5:
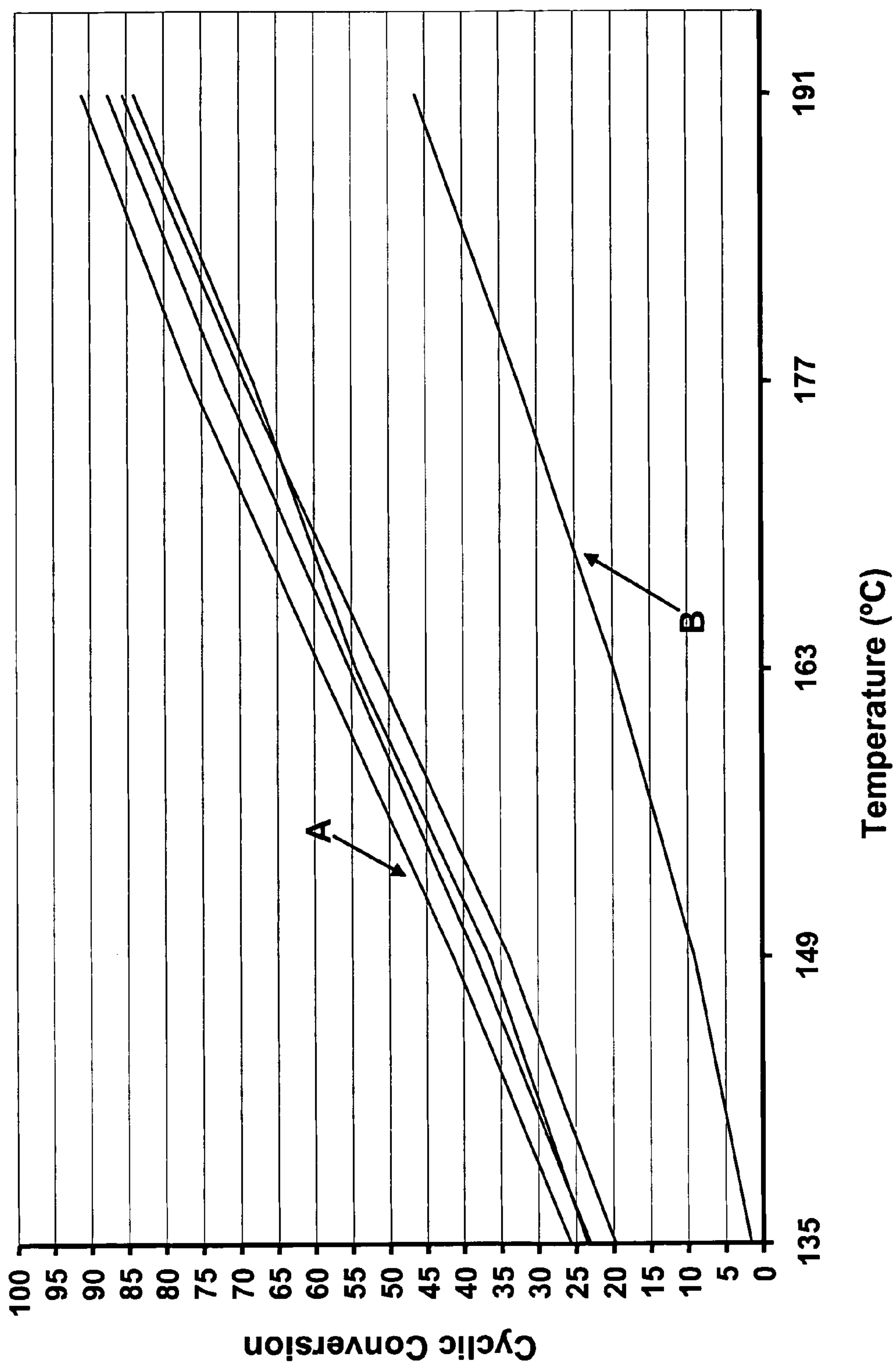
FIG. 5 is a plot of the percent of cyclic components converted to non-cyclic components versus temperature for an isomerization process using an available sulfated zirconia catalyst as compared to the isomerization catalyst of the present invention.

Another unexpected and non-obvious result of using this novel catalyst is that a substantially greater amount of cyclic components are converted to paraffins. These paraffins are subsequently isomerized to the high octane, high value, products. This unexpected benefit results in a more valuable product as compared to isomerization processes using other catalysts. FIG. 5 shows the cyclic component conversion ability of the catalyst used in the present invention as compared to an available sulfated zirconia isomerization catalyst. The catalyst of the current invention converts significantly more cyclic compounds than the available sulfated zirconia catalyst.

Yet another unexpected benefit of using this novel isomerization catalyst in the isomerization process is the sulfur and water tolerance of the catalyst. Other isomerization catalysts are generally known to be highly sensitive to sulfur and oxygen-containing compounds, thereby requiring that the feedstock be relatively free of such compounds. A sulfur concentration no greater than 0.5 ppm is generally required. With other catalysts, the presence of sulfur in the feedstock serves to temporarily deactivate the catalyst by platinum poisoning. Also, with other catalysts, water can act to permanently deactivate the catalyst. Therefore, in other systems, water, as well as oxygenates, in particular $C_1$–$C_5$ oxygenates, that can decompose to form water, can only be tolerated in very low concentrations. Feedstocks would have to be treated by any method that would remove water and sulfur compounds. For example, sulfur may be removed from the feed stream by hydrotreating and a variety of commercial dryers are available to remove water from the feed components. Adsorption processes for the removal of sulfur and water from hydrocarbon streams are also well known to those skilled in the art. However, due to the sulfur and water tolerance of the catalyst of the present invention, it is less likely that such feedstock treatments would be required. The elimination of feedstock treatment equipment results in a reduction in capital needed to construct the units and an ongoing reduction in the operating costs. Furthermore, costs associated with corrosion and emission control commonly encountered in some other isomerization processes are eliminated thereby making the present invention more economical.

Operating conditions within the isomerization zone are selected to maximize the production of isoalkane product from the feed components. Temperatures within the reaction zone will usually range from about 40°–235° C. (100°–455° F.). Lower reaction temperatures are generally preferred since they usually favor equilibrium mixtures of isoalkanes versus normal alkanes. Lower temperatures are particularly useful in processing feeds composed of $C_5$ and $C_6$ alkanes where the lower temperatures favor equilibrium mixtures having the highest concentration of the most branched isoalkanes. When the feed mixture is primarily $C_5$ and $C_6$ alkanes temperatures in the range of from 60° to 160° C. are preferred. Thus, when the feed mixture contains significant portions of $C_4$–$C_6$ alkanes most suitable operating temperatures are in the range from 145° to 225° C. The reaction zone may be maintained over a wide range of pressures. Pressure conditions in the isomerization of $C_4$–$C_6$ paraffins range from 7 barsg to 70 barsg. Preferred pressures for this process are in the range of from 20 barsg to 30 barsg. The feed rate to the reaction zone can also vary over a wide range. These conditions include liquid hourly space velocities ranging from 0.5 to 12 $hr^{-1}$ however, space velocities between 1 and 6 $hr^{-1}$ are preferred.

The isomerization zone is not restricted to a particular type of isomerization zone. The isomerization zone can consist of any type of isomerization zone that takes a stream of $C_5$–$C_6$ and possibly some $C_7$ straight-chain hydrocarbons or a mixture of straight-chain and branched-chain hydrocarbons and converts straight-chain hydrocarbons in the feed mixture to branched-chain hydrocarbons and branched hydrocarbons to more highly branched hydrocarbons thereby producing an effluent having branched-chain and straight-chain hydrocarbons. Often, the isomerization zone will consist of a single reactor. A multiple-reactor system with, for example, a first stage reactor and a second stage reactor in the reaction zone is an alternative embodiment. For a multiple reactor system, the catalyst used is distributed between the reactors in any reasonable distribution. The use of multiple reaction zones aids in maintaining lower catalyst temperatures. This is accomplished by having any exothermic reaction such as hydrogenation of unsaturates performed in the first vessel with the rest of the reaction carried out in a final reactor stage at more favorable temperature conditions. For example, the relatively cold hydrogen and hydrocarbon feed mixtures are passed through a cold feed exchanger that heats the incoming feed against the effluent from the final reactor. The feed from the cold feed exchanger is carried to the hot feed exchanger where the feed is heated against the effluent carried from the first reactor. The partially heated feed from hot feed exchanger is carried through an inlet exchanger that supplies any additional heat requirements for the feed and then into a first reactor. Effluent from the first reactor is carried to the second reactor after passage through an exchanger to provide inter-stage cooling. The isomerization zone effluent is carried from second reactor through a feed exchanger to heat the isomerization feed stream and combined with the reforming zone effluent for additional processing.

The combined reformate-isomerate stream may be further processed in a product separation zone to separate the combined product stream into a product stream containing largely $C_5$ and heavier hydrocarbons and into an overhead gas stream which is made up of lighter hydrocarbons, $C_4$ and lighter boiling compounds, and hydrogen. A portion of the overhead gas stream may be recycled to the isomerization zone, the reforming, zone or both. And a portion of the overhead gas stream may be conducted to a net gas recovery zone for further separation and recovery of desired products.

The $C_5$ and heavier hydrocarbons from the product separation zone are conducted to a separation zone where additional $C_4$ and lighter hydrocarbons are removed in a separation zone overhead stream, $C_4$ and lighter boiling compounds are removed in another stream, and a product stream is also removed from the separation zone for gasoline blending or further processing. The separation zone may contain a fractional distillation unit such as a stabilizer.

One embodiment of the invention is shown in FIG. 1. A reforming zone feedstock containing from $C_6$ to about $C_{11}$ or $C_{12}$ hydrocarbons with a boiling point range from about 82 to about 204° C. is introduced into a heat exchanger 12 via line 10. Heat exchanger 12 operates to exchange heat between the reforming zone effluent and the reforming zone feedstock. A heated reformer zone feed stream is withdrawn from heat exchanger 12 in line 14 and is passed through a heater 16 which is capable of interstage heating of multiple streams. The fully heated reformer feed stream 18 is passed to the first stage of a reforming reactor 20 containing reforming catalyst. FIG. 1 shows the reforming reactor to be of a continuous catalyst regeneration type where spent catalyst is continuously removed from the reactor in line 24 and conducted to a regeneration zone 22. Regenerated catalyst is introduced into reforming reactor 20 via line 26. At each stage of the reforming reactor, the reaction mixture is conducted from the reforming reactor to interstage heater 16 and then the heated reaction mixture is returned to the reforming reactor 20. The reforming reactor effluent is conducted in line 28 to heat exchanger 12 where the heat from the reformate is exchanged with the reforming zone feed stream to at least partially heat the reforming zone feed stream. The reforming zone effluent containing the reformate is withdrawn from heat exchanger 12 in line 30.

Concurrently, isomerization zone feed of the type previously described is introduced via line 32 to the isomerization zone 34 which contains the novel isomerization catalyst of the present invention. The isomerization zone is operated at conditions previously discussed. Hydrogen is admixed with the feed to the isomerization zone in an amount that will provide a hydrogen to hydrocarbon molar ratio of from 0.05 to 5.0 in the effluent from the isomerization zone. Make-up gas is provided through line 50. The isomerization zone feed stream in line 32 may be heat exchanged with the isomerization zone effluent in line 36 before being introduced into isomerization zone 34. Within isomerization zone 34, isomerized products are generated using the novel catalyst of the present invention, and the isomerized products are conducted from the isomerization zone in line 36 as the isomerization zone effluent.

The isomerization zone effluent in line 36 is combined with the reformate in line 30 to form a combined product stream in line 38 which is conducted to a product separator zone 40. The combined product stream in line 38 enters a product separator 40 which divides the combined product stream into a product stream 42 comprising $C_5$ and heavier hydrocarbons, and an overhead gas stream 44 which is made up of lighter hydrocarbons, $C_4$ and lighter boiling compounds, and hydrogen. Conditions for the operation of the product separator include pressures ranging from 25 to 600 psig. Specific embodiments utilize pressures from 35 to about 250 psig. Suitable designs for rectification columns and separator vessels are well known to those skilled in the art. The hydrogen-rich gas stream is carried in line 44 from the product separator and divided into two portions, a first portion in line 46 and a second portion in line 48. Line 48 is recycled using recycle compressor 52 to combine a portion in line 56 with the reforming zone feedstock in line 10 and a portion in line 50 to combine with the isomerization zone feed stream in line 32. The portion of the hydrogen-rich gas stream from the product separator in line 46 is conducted to a net gas recovery zone 64 where further separation may be conducted depending upon the specific application. A purified gas stream 68 may be recovered from the net gas recovery zone 64 for further processing or fuel gas use. The remainder containing heavier components maybe conducted to stabilizer 58 via line 70.

The remainder of the combined product stream from product separator 40 is conducted in line 42 to stabilizer 58 that removes light gases and butane from the effluent via line 60. The amount of butane taken off from the stabilizer will vary depending upon the amount of butane entering the process. The stabilizer normally runs at a pressure of from 800 to 1700 Kpaa. The bottoms stream 62 from stabilizer 58 provides a stream comprising generally $C_5$ and higher boiling hydrocarbons that include aromatics, normal paraffins, and branched isomerized products. $C_4$ and lighter hydrocarbons are taken overhead by line 72 and passed to net gas recovery zone 64. Bottoms stream 62 may be used for gasoline blending or for further processing.

Figure 2:
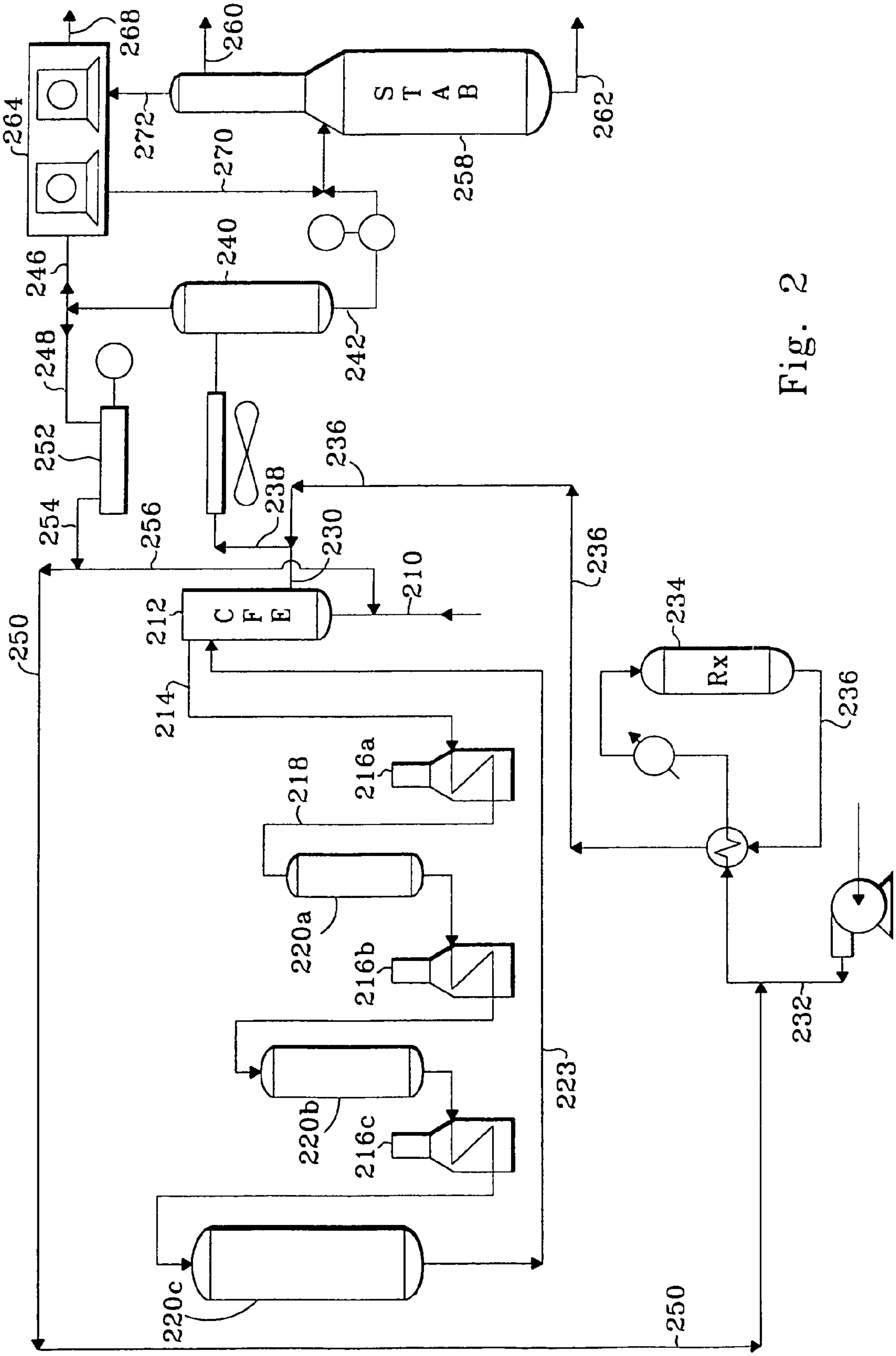
FIG. 2 is a schematic drawing of the process of this invention where the reforming zone is operated in the semi-continuous regeneration mode.

Another embodiment of the invention is shown in FIG. 2 where the reforming zone is operated in a semi-regeneration mode. A reforming zone feedstock containing from $C_6$ to about $C_{11}$ or $C_{12}$ hydrocarbons with a boiling point range from about 82 to about 204° C. is introduced into a heat exchanger 212 via line 210. Heat exchanger 212 operates to exchange heat between the reforming zone effluent and the reforming zone feedstock. A heated reformer zone feed stream is withdrawn from heat exchanger 212 in line 214 and is passed through a heater **216*a* to fully heat the feed stream to the required temperature. The fully heated reformer feed stream 218 is passed to the first reactor of a series of reforming reactors 220*a*, 220*b*, and 220*c* each containing reforming catalyst. The reforming reactors may be of a periodic catalyst regeneration type where catalyst from a reactor may be removed for off-line catalyst regeneration. In between each reactor in the reforming zone, the reaction mixture is conducted from a reforming reactor to a heater 216*b* or 216*c* and then the heated reaction mixture is returned to the reforming reactor 220*b* or 220*c*. The reforming reactor effluent is conducted in line 228 to heat exchanger 212 where the heat from the reformate is exchanged with the reforming zone feed stream to at least partially heat the reforming zone feed stream. The reforming zone effluent containing the reformate is withdrawn from heat exchanger 212 in line 230**.

The isomerization zone and the processing of the combined product stream is as discussed with respect to FIG. 1. Concurrently, isomerization zone feed of the type previously described is introduced via line 232 to the isomerization zone 234 which contains the novel isomerization catalyst of the present invention. The isomerization zone is operated at conditions previously discussed. Hydrogen is admixed with the feed to the isomerization zone in an amount that will provide a hydrogen to hydrocarbon molar ratio of from 0.05 to 5.0 in the effluent from the isomerization zone. Make-up gas is provided through line 250. The isomerization zone feed stream in line 232 may be heat exchanged with the isomerization zone effluent in line 236 before being introduced into isomerization zone 234. Within isomerization zone 234, isomerized products are generated using the novel catalyst of the present invention, and the isomerized products are conducted from the isomerization zone in line 236 as the isomerization zone effluent.

The isomerization zone effluent in line 236 is combined with the reformate in line 230 to form a combined product stream in line 238 which is conducted to a product separator zone 240. The combined product stream in line 238 enters a product separator 240 which divides the combined product stream into a product stream 242 comprising $C_5$ and heavier hydrocarbons, and an overhead gas stream 244 which is made up of lighter hydrocarbons, $C_4$ and lighter boiling compounds, and hydrogen. Conditions for the operation of the product separator include pressures ranging from 100 to 600 psig. Specific embodiments utilize pressures from 200 to about 500 psig. Suitable designs for rectification columns and separator vessels are well known to those skilled in the art. The hydrogen-rich gas stream is carried in line 244 from the product separator and divided into two portions, a first portion in line 246 and a second portion in line 248. Line 248 is recycled using recycle compressor 252 to combine a portion in line 256 with the reforming zone feedstock in line 210 and a portion in line 250 to combine with the isomerization zone feed stream in line 232. The portion of the hydrogen-rich gas stream from the product separator in line 246 is conducted to a net gas recovery zone 264 where further separation may be conducted depending upon the specific application. A purified gas stream 68 may be recovered from the net gas recovery zone 264 for further processing or fuel gas use. The remainder containing heavier components may be conducted to stabilizer 258 via line 270.

The remainder of the combined product stream from product separator 240 is conducted in line 242 to stabilizer 258 that removes light gases and butane from the effluent via line 260. The amount of butane taken off from the stabilizer will vary depending upon the amount of butane entering the process. The stabilizer normally runs at a pressure of from 800 to 1700 Kpaa. The bottoms stream 262 from stabilizer 258 provides a stream comprising generally $C_5$ and higher boiling hydrocarbons that include aromatics, normal paraffins, and branched isomerized products. $C_4$ and lighter hydrocarbons are taken overhead by line 72 and passed to net gas recovery zone 264. Bottoms stream 262 may be used for gasoline blending or for further processing.

EXAMPLE

A comparison between the isomerization zone with the isomerization catalyst of the present invention and an isomerization process using an available sulfated zirconia catalyst was conducted using pilot plants. The pilot plants were equipped with a reactor and a gas chromatograph. The catalysts used included a catalyst containing 2.7 wt. % ytterbium, about 0.3 wt. % platinum, and 4.6 wt. % sulfate and a reference sulfated zirconia catalyst as described in U.S. Pat. No. 5,036,085 and U.S. Pat. No. 5,120,898 for comparison. Approximately 10.5 g of each sample was loaded into a multi-unit reactor assay. The catalysts were pretreated in air at 450° C. for 2–6 hours and reduced at 200° C. in hydrogen for 14 hours. Hydrogen and a feed stream containing 34 wt. % n-pentane, 55 wt. % n-hexane, 9.2 wt. % cyclohexane and methylcyclopentane and 1.8 wt. % n-heptane was passed over the catalysts at 135° C., 149° C., 163° C., 177° C. and 191° C., at approximately 250 psig, and 2.0 $hr^{-1}$ WHSV. The hydrogen to hydrocarbon molar ratio was 1.3. The products were analyzed using online gas chromatographs and the percent conversion to high-value products and of cyclohexane was determined at the different temperatures.

The results are shown in FIGS. 3, 4, and 5 showing (1) an increase in the research octane value of the product stream, (2) an increase in the amount of iso-paraffins in the product stream, and (3) that a significant amount of cyclic compounds were converted to noncyclic compounds, likely through ring opening followed by isomerization, thereby demonstrating the unexpected results of the platinum and ytterbium on sulfated zirconia catalyst used in the present invention as compared to an available sulfated zirconia catalyst.

Turning to FIG. 3 the curves labeled A represent data collected in experiments using the novel isomerization catalyst of the present invention while the curve labeled B represents data collected in the experiment using the available sulfated zirconia catalyst. The research octane number of the product streams were plotted versus time. It is clear from the plot that the research octane number of the present invention is significantly higher than that achieved using the available sulfated zirconia catalyst.

Turning to FIG. 4, again the curves labeled A represent data collected in experiments using the novel isomerization catalyst of the present invention while the curve labeled B represents data collected in the experiment using the available sulfated zirconia catalyst. The PIN (as defined above) is plotted versus temperature. It is clear that the present invention provides a significantly high PIN, indicating a greater amount of isoparaffin products, as compared to that achieved using the available sulfated zirconia catalyst.

FIG. 5 shows one unexpected result of the present invention. As with FIGS. 3 and 4, in FIG. 5 the curves labeled A represent data collected in experiments using the novel catalyst of the present invention while the curve labeled B represents data collected in the experiment using the available sulfated zirconia catalyst. The amount of cyclic components that are converted to non-cyclic components, most likely though ring opening, are plotted versus the temperature. It is clear that the isomerization catalyst of the present invention provides for a greater degree of cyclic components being converted to non-cyclic components than that achieved when using the available sulfated zirconia catalyst.

What is claimed is:

1. A process comprising:

charging a reforming feedstream to a reforming zone containing a reforming catalyst and operating at reforming conditions to generate a reforming zone effluent;

charging hydrogen and an isomerization feedstream comprising at least $C_5$–$C_6$ hydrocarbons into an isomerization zone to contact an isomerization catalyst at isomerization conditions to increase the branching of the feedstream hydrocarbons and produce the isomerization zone effluent comprising at least normal pentane, normal hexane, methylbutane, dimethylbutane, and methylpentane; wherein said isomerization catalyst is a solid acid catalyst comprising a support comprising a sulfated oxide or hydroxide of at least an element of Group IVB (IUPAC 4) of the Periodic Table, a first component selected from the group consisting of at least one lanthanide series element, mixtures thereof; wherein the atomic ratio of the first component is at least about 2 and yttrium, and a second component selected from the group consisting of platinum group metals and mixtures thereof;

combining the reforming zone effluent with the isomerization zone effluent to form a combined effluent stream;

separating the combined effluent stream into a product stream enriched in $C_5$ and heavier hydrocarbons and an overhead stream enriched in $C_4$ and lighter boiling compounds.

2. The process of claim 1 wherein the isomerization catalyst further comprises from about 2 to about 50 mass-% of a refractory inorganic-oxide binder.

3. The process of claim 1 wherein the first component is selected from the group consisting of lutetium, ytterbium, thulium, erbium, holmium, terbium, combinations thereof and yttrium.

4. The process of claim 1 wherein the first component is ytterbium.

5. The process of claim 1 wherein the isomerization catalyst further comprises a third component selected from the group consisting of iron, cobalt, nickel, rhenium, and mixtures thereof.

6. A process comprising:

charging a reforming feedstream to a reforming zone containing a reforming catalyst and operating at reforming conditions to generate a reforming zone effluent;

combining the reforming zone effluent with an isomerization zone effluent to form a combined effluent stream;

separating the combined effluent stream into a product stream enriched in $C_5$ and heavier hydrocarbons and an overhead stream enriched in $C_4$ and lighter boiling compounds;

charging a portion of the overhead stream enriched in $C_4$ and lighter boiling compounds and an isomerization feedstream comprising at least $C_5$–$C_6$ hydrocarbons into an isomerization zone to contact an isomerization catalyst at isomerization conditions to increase the branching of the feedstream hydrocarbons and produce the isomerization zone effluent comprising at least normal pentane, normal hexane, methylbutane, dimethylbutane, and methylpentane; wherein said isomerization catalyst is a solid acid catalyst comprising a support comprising a sulfated oxide or hydroxide of at least an element of Group IVB (IUPAC 4) of the Periodic Table, a first component selected from the group consisting of at least one lanthanide series element, mixtures thereof, and yttrium, and a second component selected from the group consisting of platinum group metals and mixtures thereof; wherein the atomic ratio of the first component is at least about 2.

7. The process of claim 6 wherein the isomerization catalyst further comprises from about 2 to about 50 mass-% of a refractory inorganic-oxide binder.

8. The process of claim 6 wherein the first component is selected from the group consisting of lutetium, ytterbium, thulium, erbium, holmium, terbium, combinations thereof and yttrium.

9. The process of claim 6 wherein the first component is ytterbium.

10. The process of claim 6 wherein the isomerization catalyst further comprises a third component selected from the group consisting of iron, cobalt, nickel, rhenium, and mixtures thereof.

11. The process of claim 10 wherein the third component is iron in an amount from about 0.1 to about 5 wt. %.

12. The process of claim 6 further comprising passing the product stream enriched in $C_5$ and heavier hydrocarbons to a separation zone to separate at least one separation zone overhead stream enriched in $C_4$ and lighter boiling compounds from a separation zone product stream containing $C_5$ and heavier hydrocarbons.

13. The process of claim 12 wherein the separation zone contains at least one fractional distillation unit.

14. The process of claim 12 wherein at least a portion of one separation zone overhead stream enriched in $C_4$ and lighter boiling compounds is conducted to a net gas recovery zone.

15. The process of claim 6 wherein a portion of the overhead stream enriched in $C_4$ and lighter boiling compounds is conducted to a net gas recovery zone.

16. The process of claim 12 wherein said product stream is blended into a gasoline pool to produce a motor fuel.

17. The process of claim 6 wherein said reforming feedstream includes $C_6$ and higher boiling hydrocarbons.

18. The process of claim 6 wherein said isomerization zone includes a series of two reactors, the first reactor operating at a temperature in the range of 120° to 225° C. and said isomerization zone effluent is recovered from a second reactor operating at a temperature in the range of 60° to 160° C.

* * * * *

UNITED STATES PATENT AND TRADEMARK OFFICE

CERTIFICATE OF CORRECTION

PATENT NO. : 6,979,396 B2
DATED : December 27, 2005
INVENTOR(S) : Ralph D. Gillespie et al.

It is certified that error appears in the above-identified patent and that said Letters Patent is hereby corrected as shown below:

<u>Column 17,</u>
Line 13, replace ";" with -- , --.
Lines 14-17, replace "wherein the atomic ratio of the first component is at least about 2 and yttrium, and a second component selected from the group consisting of platinum group metals and mixtures thereof;" with -- and yttrium, and a second component selected from the group consisting of platinum group metals and mixtures thereof; wherein the atomic ratio of the first component is at least about 2; --.

Signed and Sealed this

Seventh Day of March, 2006

JON W. DUDAS
*Director of the United States Patent and Trademark Office*